United States Patent
Yavorsky et al.

[11] 3,741,695
[45] June 26, 1973

[54] DEVICE FOR MANUFACTURING ENDLESS TIMING BELTS

[76] Inventors: Arsenty Vasilievich Yavorsky, ulitsa Zatonskogo 14v, kv. 70, Kiev; Vasily Stepanovich Ermin, ulitsa Gorkogo 8, Kv. 59., Alexin, both of U.S.S.R.

[22] Filed: Mar. 3, 1971

[21] Appl. No.: 120,621

[52] U.S. Cl............ 425/28, 264/231, 264/318, 425/38, 425/51
[51] Int. Cl............................................. B29h 7/22
[58] Field of Search................. 425/19, 28–35, 425/38–44, 47–58; 264/318, 231

[56] References Cited
UNITED STATES PATENTS
1,748,626   2/1960   Waner .................................. 425/28
3,634,572   1/1972   Richmond et al. ............. 264/231 X
2,586,300   2/1952   Campbell .............................. 425/54

Primary Examiner—J. Spencer Overholser
Assistant Examiner—B. D. Tobor
Attorney—Waters, Roditi, Schwartz & Nissen

[57] ABSTRACT

A device for manufacturing endless timing belts with internal transverse teeth, comprising pulling the belt blank over a toothed mandrel whose outside diameter is larger than the inside diameter of the blank after which the blank is subjected to radial pressing and vulcanization; the device comprising a tapered mandrel whose diameter at the thicker end is equal to the diameter of the toothed mandrel, means for fastening the thicker end of the tapered mandrel to the toothed mandrel, and means for pushing the blank along the tapered mandrel from its thinner end to the thicker end and for pulling the blank over the toothed mandrel.

5 Claims, 5 Drawing Figures

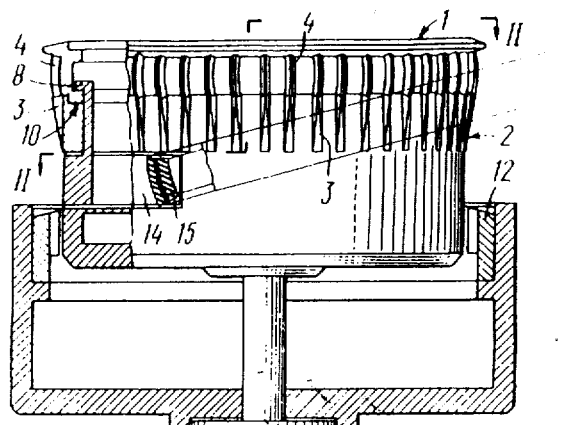
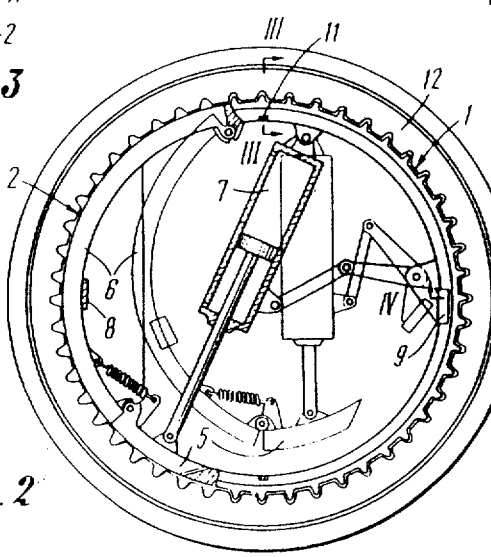
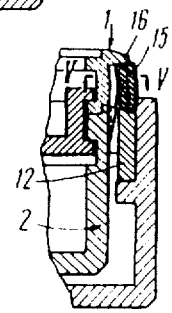
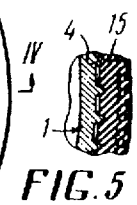

DEVICE FOR MANUFACTURING ENDLESS TIMING BELTS

The present invention relates to the methods of manufacturing drive belts and more particularly it relates to the methods of manufacturing endless timing belts with internal transverse teeth and to the devices for the realization of said method.

Known in the art is a method of manufacturing endless drive belts with internal transverse teeth wherein the pipe-shaped belt blank is pulled over a cylindrical metal toothed mandrel whose diameter is equal to the inside diameter of the belt. For this purpose, a layer of diagonally cut fabric is placed on the toothed mandrel, then it is packed down by a toothed roller so as to force the fabric at least partly around the teeth and tooth spaces of the toothed mandrel. Then a layer of raw rubber (compression layer of the belt) is put on top of the fabric layer. Then the strength cord is wound very tightly around the mandrel thus forcing the layer of raw rubber into the tooth spaces of the toothed mandrel, and forming the belt teeth partly, after which the remaining layers of the future belt are applied to the cord. Now, the toothed mandrel with the blank is placed into a vulcanizer where the blank is subjected to radial pressing and vulcanization.

Then the vulcanized tubular blank is removed from the toothed mandrel and cut into separate belts of the required width and cross section.

The disadvantage of the known method lies in that it fails to produce belts completely wrapped with the layers of fabric.

When the known method is used for manufacturing V-belts, cutting of the belts from the tubular blank leaves a large amount of waste.

Besides, the known method is not efficient since the strength cord can be wound with a high tension only at low winding speeds.

An object of the invention is to provide such a method of manufacturing endless timing belts which would produce high-quality belts with a smaller amount of source materials as compared with the known method and which would be more efficient.

This object is accomplished by providing a method of manufacturing endless timing belts in which, according to the invention, the inside diameter of the blank is made smaller than the outside diameter of the toothed mandrel and the finished blank is pulled over the toothed mandrel.

While making V-belts, it is expedient that the blank slipped on the toothed mandrel should be pressed axially before radial pressing and vulcanization.

The device for pulling the blank on the toothed mandrel is made, according to the invention, in the form of a tapered mandrel whose diameter at the thicker end is equal to the diameter of the toothed mandrel on which the blank is pulled, said tapered mandrel being provided with the means for fastening its thicker end to the toothed mandrel and with the means for pushing the belt blank along the tapered mandrel, from its thinner end towards the thicker end, and for pulling it over the toothed mandrel.

The tapered mandrel may be provided with longitudinal teeth whose profile at the thicker end of the tapered mandrel corresponds to the tooth profile of the toothed mandrel.

It is expedient that the tapered mandrel should be made hollow with a part of its wall retracting inward for placing on it the belt blank and then tensioning it preliminarily.

The means for fastening the tapered mandrel to the toothed mandrel can be made in the form of L-shaped grips located inside the tapered mandrel and interacting by their projections with the slot of the toothed mandrel.

The means for pushing the belt blank from the thinner end of the tapered mandrel towards its thicker end and for pulling it over the toothed mandrel may incorporate a circular stop arranged coaxially with relation to the tapered mandrel and intended to stop the blank in place; besides, said means may be provided with a drive for the axial movement of the tapered mandrel with relation to the circular stop.

Now the invention will be made more apparent by way of example with reference to the appended drawings in which:

FIG. 1 shows the device for placing the blank on the toothed mandrel, according to the invention, partly cut-away;

FIG. 2 is a section taken along line II—II in FIG. 1;

FIG. 3 is a section taken along line III—III in FIG. 2;

FIG. 4 is a section taken along line IV—IV in FIG. 2 with the blank in the position corresponding to its axial pressing;

FIG. 5 is a section taken along line V—V in FIG. 4.

The device for placing the blank on the toothed mandrel 1 (FIG. 1) is made in the form of a tapered mandrel 2 whose diameter at the thicker end is equal to the diameter of the toothed mandrel 1. The external surface of the tapered mandrel 2 is provided with longitudinal teeth 3 whose profile at the thicker end corresponds to the profile of the teeth 4 of the toothed mandrel 1.

The tapered mandrel 2 is hollow and part of its wall can be retracted inward. This part of the wall consists of two sections 5 and 6 (FIG. 2), held together by a spring and articulated to each other. The section 5 can be moved by a power cylinder 7. The tapered mandrel 2 has two L-shaped grips 8 and 9 intended to fasten said mandrel 2 to the toothed mandrel 1. The projections of the grips 8 and 9 interact with the corresponding slots of the toothed mandrel 1 (see position of the grip 8 in FIG. 1). The grip 8 is secured on the retracting section 6 whereas the grip 9 (FIG. 2) is articulated to the wall of the tapered mandrel 2 and connected with the power cylinder 7 which retracts the grip 9 into the tapered mandrel 2.

The face surface of the tapered mandrel 2 has a recess 10 (FIG. 1) receiving the toothed mandrel 1. The teeth 3 of the tapered mandrel 2 are aligned with the teeth 4 of the toothed mandrel 1 by means of two guide keys 11 (FIGS. 2, 3) located on the internal surface of the tapered mandrel 1 and entering the longitudinal slots of the toothed mandrel 1.

Arranged coaxially with the tapered mandrel 2 is a circular stop 12. The tapered mandrel 2 is connected with the rod of the power cylinder 13 (FIG. 1) which ensures its axial displacement with relation to the circular stop 12.

The method of manufacturing endless timing belts is realized as follows.

First, the belt blank is made, its inside diameter being smaller than the outside diameter of the toothed mandrel 1. For this purpose a soft rubberized-fabric cylindrical mandrel is wound consecutively with a layer of raw rubber forming the compression layer of the belt, a layer of cord, and another layer of raw rubber forming the tension layer of the belt. The cord layer consists of polyamide fibers characterized by intensive shrinkage at the temperature of vulcanization of rubber.

Now, the tubular blank made in this manner is cut on the same mandrel into individual blanks in the form of rings whose width and cross section correspond to the required width and cross section of the finished belts. If required, these blanks can be wrapped with fabrics. The wrapping material may be selected from diagonally cut fabrics stretched in the direction perpendicular to the subsequent stretching of said fabric in the process of belt forming.

The inside surface of the belt blank which later will form the toothed surface of the belt, can be covered with straight-cut fabric which has previously been pleated into folds whose height corresponds to the tooth height of the toothed mandrel 1.

The belt blank is pulled on the toothed mandrel 1 with the aid of a special device.

The sections 5 and 6 (FIG. 2) of the tapered mandrel 2 are retracted by the power cylinder 7 into the tapered mandrel 2 thus forming a slot 14 in the tapered mandrel 2 (FIG. 1) for inserting the blank 15.

The grips 8 and 9 are retracted into the tapered mandrel 2 together with the sections 5 and 6 (FIG. 2).

The toothed mandrel 1 is placed on the tapered mandrel 2, entering the face slot 10 of the latter.

The belt blank 15 is inserted into the slot 14 as shown in FIG. 1 after which the sections 5 and 6 of the tapered mandrel 2 are extended outward with the aid of the power cylinder 7 (FIG. 2). This creates a certain tensioning of the blank on the tapered mandrel 2. Simultaneously, the grips 8 and 9 couple the toothed mandrel 1 to the tapered mandrel 2.

Then the power cylinder 13 (FIG. 1) displaces the tapered mandrel 2 to the downmost position with respect to the circular stop 12. The blank 15 bears against the circular stop 12 and is pushed along the tapered mandrel 2 towards the toothed mandrel 1 so that the teeth 3 of the tapered mandrel 2 cut into the layer of raw rubber which forms the compression layer of the future belt, thus forming partly the belt teeth on the blank 15. Then the blank 15 is pulled by the circular stop 12 over the toothed mandrel 1. The displacement of the blank 15 ceases when it comes to bear against the projection 16 (FIG. 4) of the toothed mandrel 1. If it is intended to make a Vee-shaped belt, the surfaces of the projection 16 and circular stop 12 are slanted and the circular stop 12 is used for axial pressing of the blank during which the side surfaces of the future belt are formed preliminarily.

The teeth 4 of the toothed mandrel 1 forced into the layer of raw rubber as shown in FIG. 5 form partly the toothed surface of the future belt.

Then the power cylinder 13 (FIG. 1) displaces the tapered mandrel 2 to the uppermost position, together with the toothed mandrel 1 and the blank 15 pulled over it. The power cylinder 7 (FIG. 2) retracts the sections 5 and 6 and the grips 8 and 9 into the tapered mandrel 2.

The toothed mandrel 1 with the blank 15 on it is relieved and the device is ready for pulling the next blank over the toothed mandrel.

A number of toothed mandrels with the blanks pulled on them are assembled to make a sectional drum-type former and subjected to axial pressing in order to obtain the former of a certain height.

The former is then placed into the vulcanizer where the blanks are radially pressed and vulcanized with the forming forces producing specific pressures up to 90 kg/cm$^2$. After vulcanization, the former with the vulcanized belts in the pressed state is cooled down to room temperature, then pressing is discontinued, the former is disassembled and the finished articles are removed from the toothed rings.

The claimed method provides for the manufacture of high-quality efficient endless drive belts. It also ensures the manufacture of belts completely wrapped with fabric. It reduces greatly the amount of waste in the production of Vee-belts.

What is claimed is:

1. A device for manufacturing endless timing belts and comprising; a toothed mandrel adapted to have a belt blank for forming said belts pulled thereover and having an outside diameter larger than the inside diameter of the blank; a toothed tapered mandrel whose diameter at the thicker end is equal to the diameter of said toothed mandrel; a means for fastening said thicker end of said tapered mandrel to said toothed mandrel; and means for pushing the belt blank along said tapered mandrel, from its thinner end towards the thicker end, and for pulling said blank over said toothed mandrel.

2. A device according to claim 1 wherein said tapered mandrel has longitudinal teeth whose profile at the thicker end of said tapered mandrel corresponds to the profile of the teeth of said toothed mandrel.

3. A device according to claim 1 wherein said tapered mandrel is hollow and a part of its wall can be retracted inward for putting and tensioning preliminarily said belt blank.

4. A device according to claim 3 wherein said means for fastening said tapered mandrel to said toothed mandrel is made in the form of L-shaped grips located inside the tapered mandrel and wherein said toothed mandrel has a slot to receive the projections of said L-shaped grips.

5. A device according to claim 1 wherein said means for pushing the belt blank along said tapered mandrel, from its thinner and towards the thicker end, and for pulling it over said toothed mandrel comprises: a circular stop arranged coaxially with said tapered mandrel and intended to hold in place the blank; a drive for the axial displacement of said tapered mandrel with relation to said circular stop.

* * * * *